United States Patent
Gao

(10) Patent No.: US 8,801,468 B2
(45) Date of Patent: Aug. 12, 2014

(54) SURFACE CONTACT CARD HOLDER FOR ELECTRONIC DEVICE

(71) Applicant: Yan-Ling Gao, Shenzhen (CN)

(72) Inventor: Yan-Ling Gao, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 52 days.

(21) Appl. No.: 13/653,087

(22) Filed: Oct. 16, 2012

(65) Prior Publication Data
US 2013/0171848 A1 Jul. 4, 2013

(30) Foreign Application Priority Data
Dec. 30, 2011 (CN) .......................... 2011 1 0454546

(51) Int. Cl.
*H01R 24/00* (2011.01)

(52) U.S. Cl.
USPC ........................................................ 439/630

(58) Field of Classification Search
USPC .................... 439/630, 159, 327, 328
See application file for complete search history.

(56) References Cited

U.S. PATENT DOCUMENTS 7,407,414 B2 *  8/2008  Zuo et al. ...................... 439/630
8,154,878 B2 *  4/2012  Wang et al. ................... 361/754

* cited by examiner

*Primary Examiner* — Xuong Chung Trans
(74) *Attorney, Agent, or Firm* — Novak Druce Connolly Bove + Quigg LLP

(57) ABSTRACT

A surface contact card holder includes a housing, a tray and two elastic members positioned between the tray and the housing. The housing includes a support plate and defines an opening. The support plate defines a through hole. The tray is slidable and receivable in the housing from the opening and the tray is configured for carrying a surface contact card therein. The tray includes a tray body and a cantilever arm extending from the tray body. The cantilever arm includes a protruding portion releasbly latched in the through hole. When the protruding portion is pressed to release the tray, the tray is automatically slid out of the opening under the elastic force of the elastic members to allow insertion and removal of the surface contact card from the housing.

14 Claims, 6 Drawing Sheets

SURFACE CONTACT CARD HOLDER FOR ELECTRONIC DEVICE

BACKGROUND

1. Technical Field

The present disclosure generally relates to card use in electronic devices, and particularly to a surface contact card holder for an electronic device.

2. Description of Related Art

With the development of wireless communication and information processing technologies, portable electronic devices such as mobile phones are now widely used. Surface contact cards having special circuits are widely used in portable electronic devices to enhance or add to the functions of the portable electronic devices. For example, a subscriber identity module (SIM) card can be placed in a mobile phone to dedicate the mobile phone's functions to the SIM card owner. By changing SIM cards, a single mobile phone can be used by many different SIM card owners as a personal phone.

During the insertion and/or removal of SIM cards from personal electronic devices, friction is produced between the SIM card and a connector under the SIM card. Thus, after repeated use, the contact terminals of the SIM card and the connector are likely to wear out. This may result in an ineffective electrical connection between the chip card and the connector.

Therefore, there is room for improvement within the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the surface contact card holder. Moreover, in the drawings, like reference numerals designate corresponding parts throughout the several views.

DETAILED DESCRIPTION

The disclosed surface contact card holder can seat surface contact cards such as SIM cards, compact flash cards (CF)s and multimedia cards (MMC)s, for example. The disclosed electronic device, shown in the exemplary embodiment as a mobile phone, can alternatively be a PDA, camera, recorder, or other devices, while remaining well within the scope of the disclosure.

Figure 1:
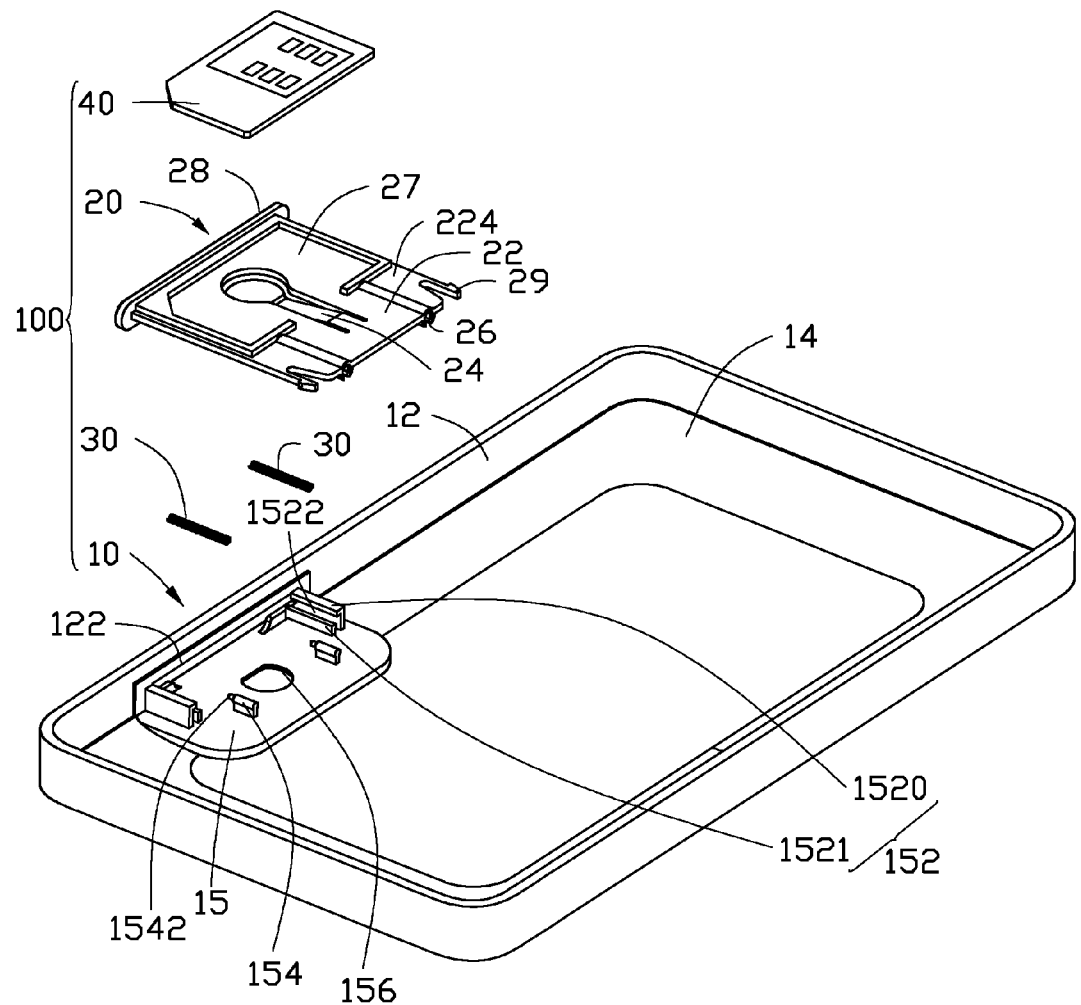
FIG. 1 is an exploded, isometric view of a surface contact card holder in accordance with an exemplary embodiment.

FIG. 1 shows a surface contact card holder 100 mounted on an electronic device. The surface contact card holder 100 includes a housing 10, a tray 20 and two elastic members 30. The tray 20 may be slidably positioned in the housing 10 to receive a surface contact card 40.

The housing 10 may be a portion of the electronic device, and includes a main section 14 integrally formed together with a sidewall 12. The sidewall 12 defines an opening 122 for allowing the tray 20 to move in and out. A support plate 15 is positioned on the main section 14, and is adjacent to the opening 122. A pair of guiding portions 152 and a pair of positioning portions 154 are formed on the support plate 15. Each guiding portion 152 is positioned at one side of the opening 122, and abuts against the sidewall 12. Each guiding portion 152 includes a first plate 1520 and a second plate 1521 opposite to each other. The second plate 1520 perpendicularly extends from the support plate 15. The first plate 1520 firstly perpendicularly extends from the support plate 15, and then horizontally extends toward the first plate 1520. The first plate 1520 is higher than the second plate 1521. A guiding slot 1522 is defined between the first plate 1520 and a second plate 1521 for slidably receiving the tray 20. The positioning portions 154 are positioned between the guiding portions 152. Each positioning portion 154 includes a cylindrical post 1542 for mounting one end of each elastic member 30. The support plate 15 defines a through hole 156 communicating the main section 14.

Figure 2:
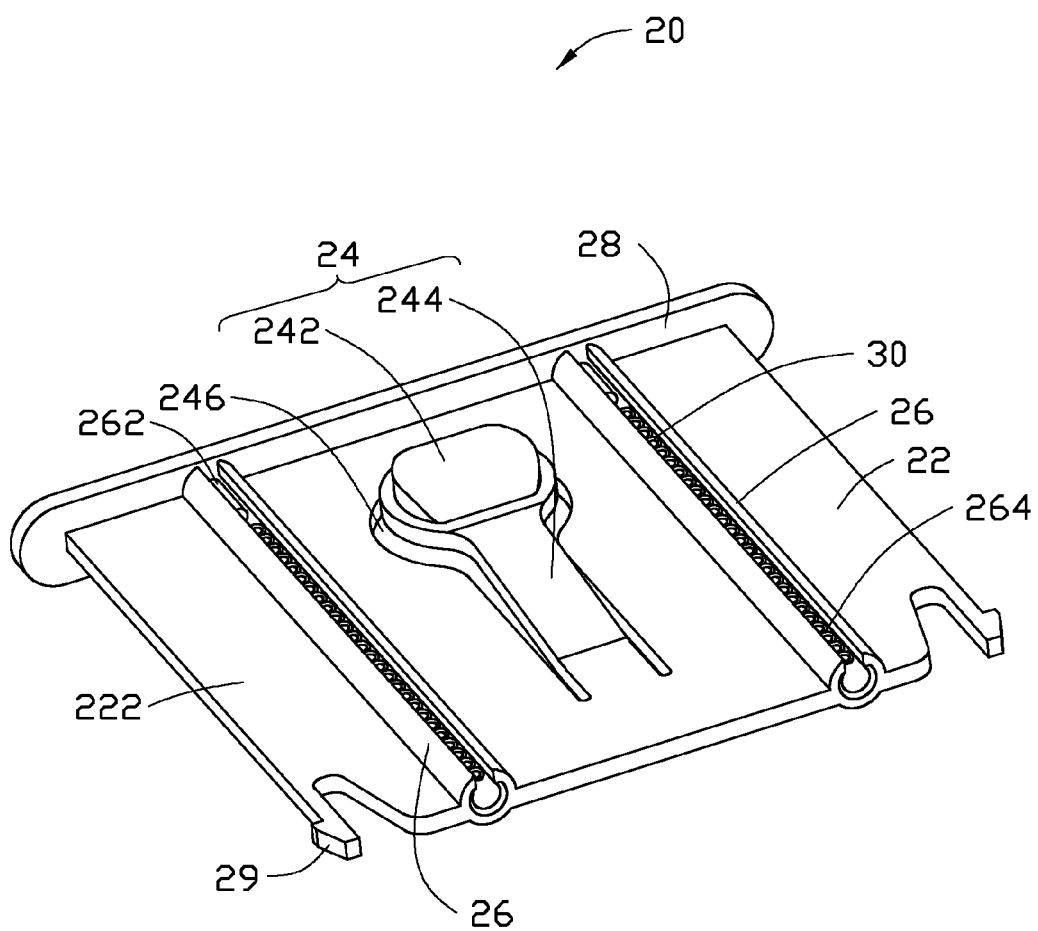
FIG. 2 is a schematic view of the tray in FIG. 1.

Referring to FIG. 2, the tray 20 includes a tray body 22, a cantilever arm 24, two sleeve portions 26, a cover portion 28, and two hooks 29. The tray body 22 includes a first surface 222 and a second surface 224. Two side edges of the tray body 22 are slidably received in the guiding slots 1522. The tray body 22 defines a notch 246 and the cantilever arm 24 is received in the notch 246. The cantilever arm 24 includes a protruding portion 242 and an arm portion 244 integrally formed together. The arm portion 244 extends from the tray body 22, and the protruding portion 242 deflects far away from the first surface 222. The protruding portion 242 can be pressed into the notch 246 and the arm portion 244 is deformed. When the tray 20 is assembled into the housing 10, the protruding portion 242 is releasably latched in the through hole 156 of the housing 10 and is exposed from the housing 10. The second surface 224 of the tray body 22 defines a receiving groove 27 for receiving the surface contact card 40. The cover portion 28 is formed at one end of the tray body 22. The two sleeve portions 26 are parallel to each other on the tray body 22, and extend from the cover portion 28. Each sleeve portion 26 defines a receiving chamber 264 for receiving a corresponding elastic member 30. A shaft 262 extends from the cover portion 28, and is formed in the receiving chamber 264. The two hooks 29 are deformedly formed at another end of the tray body 22 opposite to the cover portion 28 for preventing the tray 20 from separating from the housing 10.

Figure 3:
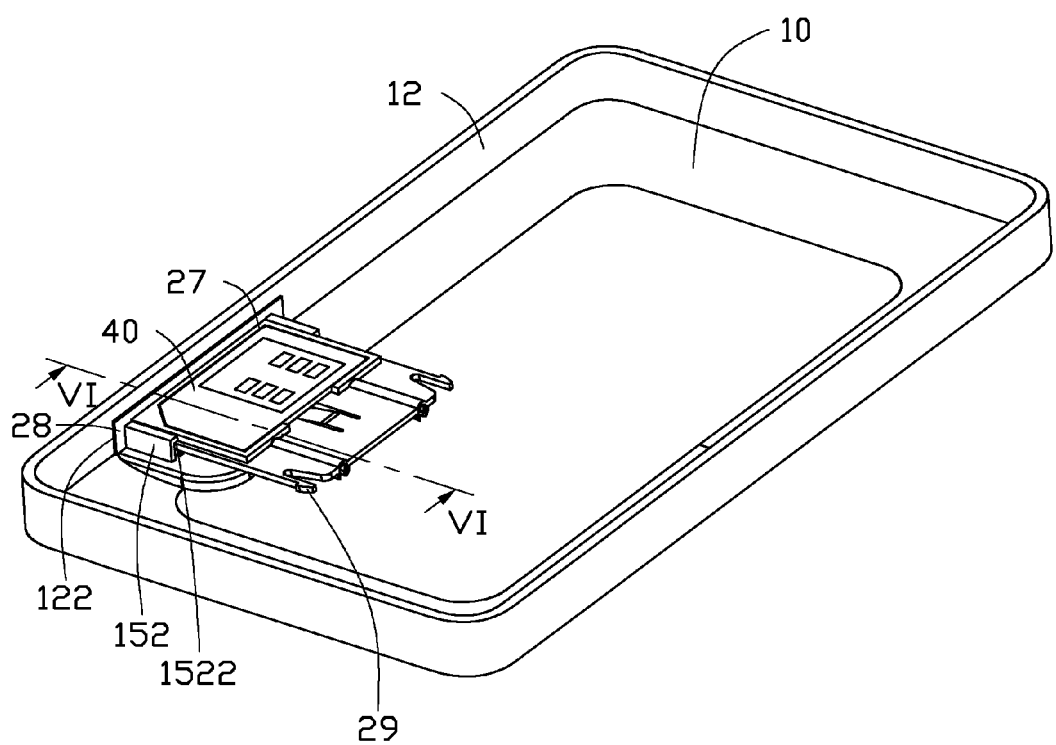
FIG. 3 is an assembled isometric view of the surface contact card holder.
Figure 4:
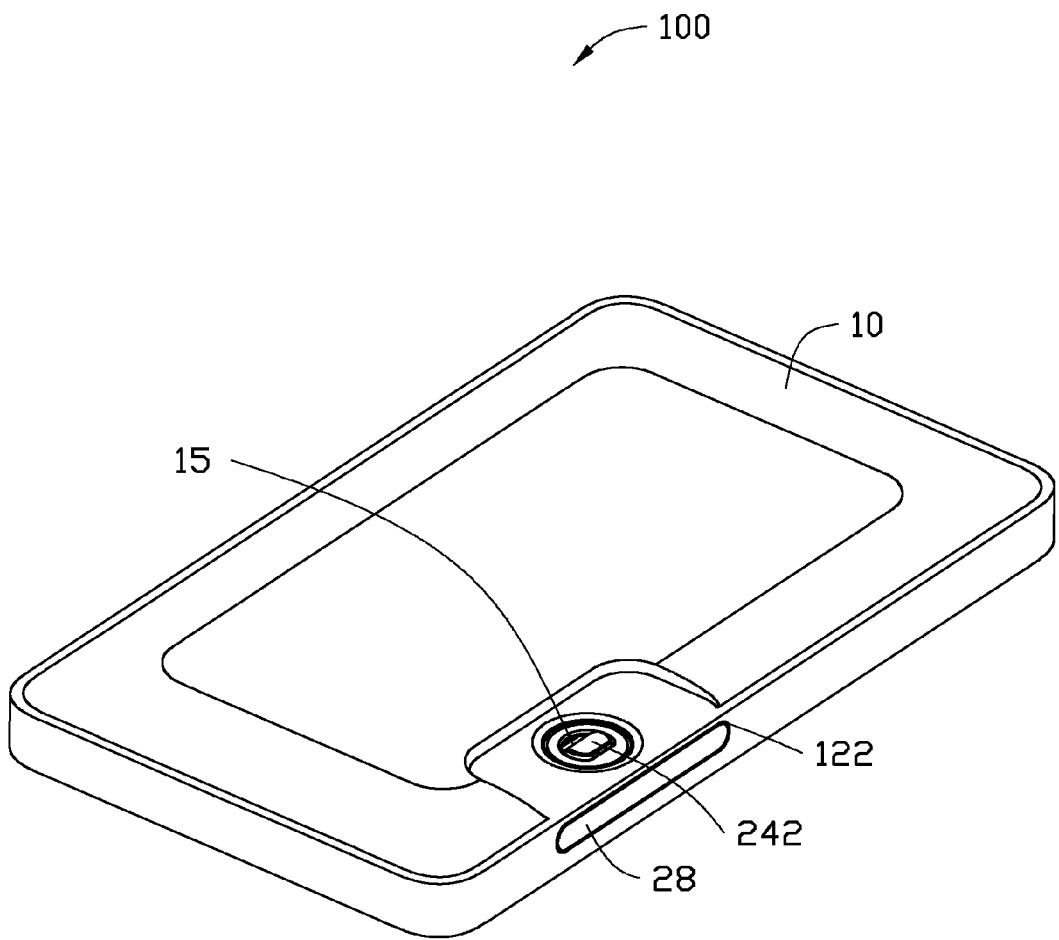
FIG. 4 is similar to FIG. 3, but shown from another aspect.

During assembly, referring to FIGS. 3 and 4, each of the elastic members 30 are assembled into the receiving chamber 264 of a corresponding sleeve portion 26. One end of each elastic member 30 is placed around the shaft 262. The protruding portion 242 is pressed toward the second surface 224 to make the tray 20 with the elastic members 30 be inserted from the opening 122 into the housing 10. The two side edges of the tray 20 are slidably received in the guiding slots 1522 and the other ends of the elastic members 30 abut against the posts 1542. During the sliding process of the tray 20, the elastic members 30 are compressed. The tray 20 is further pushed until the cover portion 28 covers the opening 122, and the protruding portion 242 is latched into the through hole 156. Thus, the assembly process of the surface contact card holder 100 is finished.

Figure 5:
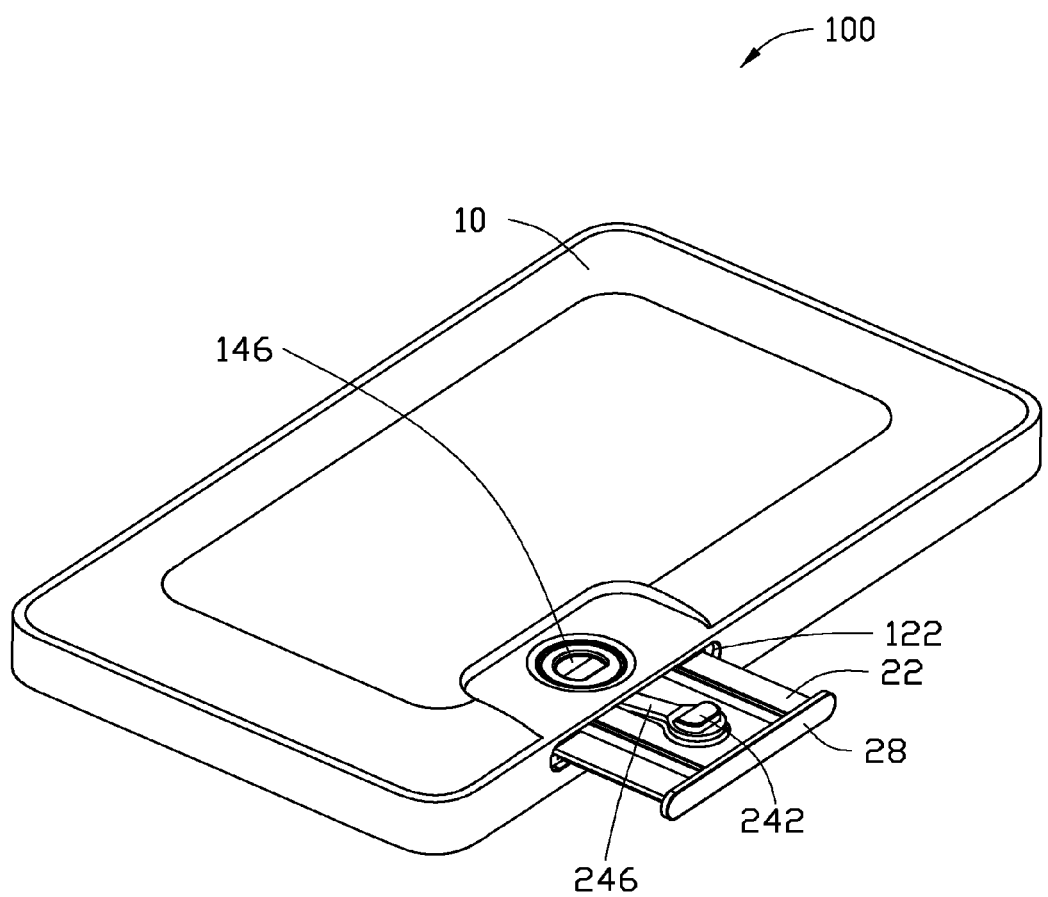
FIG. 5 is a state view of the surface contact card holder in use.
Figure 6:
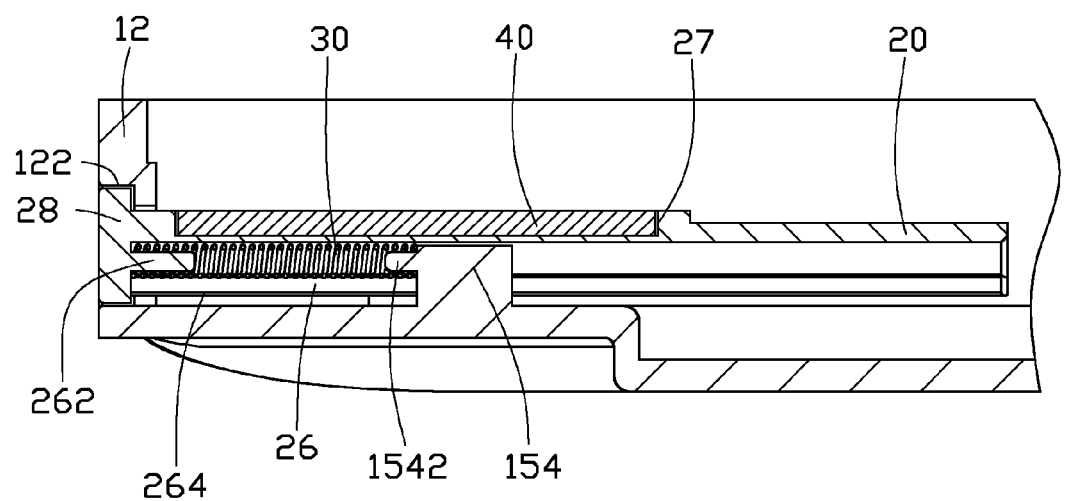
FIG. 6 is a cross sectional view of the surface contact card holder taken along line VI-VI in FIG. 4.

In use, referring to FIGS. 5 and 6, the protruding portion 242 is pressed toward inside of the housing 10 to allow the protruding portion 242 to move out of the through hole 156. The tray 20 moves out of the opening 122 under the elastic force of the elastic members 30. Then, the surface contact card 40 is inserted into the receiving groove 27 of the tray 20. The tray 20 with the surface contact card 40 is pushed to slide in the housing 10 from the opening 122 until the arcuate portions 3222 are latched in the grooves 182. Thus, the surface contact card 40 is thereby held steadily in the housing.

To remove the surface contact card 40, the protruding portion 242 is pressed toward the housing 10 until the protruding portion 242 is removed from the through hole 156. The tray 20 move out of the opening 122 under the elastic force of the elastic members 30, and the surface contact card 40 is easily removed from the tray 32.

As described above, the exemplary embodiment provides a surface contact card holder for portable electronic devices, such as mobile phones. The surface contact card holder can be easily opened and is more user-friendly.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A surface contact card holder, comprising:
  a housing including a support plate and defining an opening, the support plate defining a through hole;
  a tray being slidable and receivable in the housing from the opening and the tray configured for carrying a surface contact card therein, the tray including a tray body and a cantilever arm extending from the tray body, the cantilever arm including a protruding portion releasbly latched in the through hole; and
  at least one elastic member positioned between the tray and the housing;
  wherein the protruding portion is pressed to release the tray, the tray is automatically slid out of the opening under the elastic force of the at least one elastic member to allow insertion and removal of the surface contact card from the housing.

2. The holder as claimed in claim 1, wherein the tray includes two sleeve portions parallel to each other on the tray body, each sleeve portion defines a receiving chamber for receiving a corresponding elastic member.

3. The holder as claimed in claim 2, wherein the tray includes a cover portion 28 formed at one end of the tray body, and two hooks deformedly formed at another end of the tray body opposite to the cover portion, the cover portion covers the opening, and the hooks prevent the tray from separating from the housing.

4. The holder as claimed in claim 1, wherein the housing includes a main section integrally formed together with a sidewall, the sidewall defines the opening for allowing the tray to move in or out, and the support plate is positioned on the main section.

5. The holder as claimed in claim 2, wherein a pair of guiding portions are formed on the support plate, each guiding portion defines a guiding slot for slidably receiving the tray.

6. The holder as claimed in claim 5, wherein each guiding portion includes a first plate and a second plate opposite to each other, the first plate is higher than the second plate, the guiding slot is defined between the first plate and the second plate.

7. The holder as claimed in claim 6, wherein a pair of positioning portions are formed on the support plate, each positioning portion includes a cylindrical post for mounting one end of at least one elastic member.

8. A portable electronic device comprising:
  a housing including a support plate and defining an opening, the support plate defining a through hole;
  a holder for a surface contact card, the holder mounted on the housing, the holder comprising:
  a tray being slidable and receivable in the housing from the opening and the tray configured for carrying a surface contact card therein, the tray including a tray body and a cantilever arm extending from the tray body, the cantilever arm including a protruding portion releasbly latched in the through hole; and
  two elastic members positioned between the tray and the housing;
  wherein the protruding portion is pressed to release the tray, the tray is automatically slid out of the opening under the elastic force of the at least one elastic member to allow insertion and removal of the surface contact card from the housing.

9. The portable electronic device as claimed in claim 8, wherein the housing includes a main section integrally formed together with a sidewall, the sidewall defines the opening for allowing the tray to move in or out, and the support plate is positioned on the main section.

10. The portable electronic device as claimed in claim 8, wherein a pair of guiding portions are formed on the support plate, each guiding portion defines a guiding slot for slidably receiving the tray.

11. The portable electronic device as claimed in claim 10, wherein each guiding portion includes a first plate and a second plate opposite to each other, the first plate is higher than the second plate, the guiding slot is defined between the first plate and the second plate.

12. The portable electronic device as claimed in claim 10, wherein a pair of positioning portions are formed on the support plate, each positioning portion includes a cylindrical post for mounting one end of at least one elastic member.

13. The portable electronic device as claimed in claim 8, wherein the tray includes two sleeve portions parallel to each other on the tray body, each sleeve portion defines a receiving chamber for receiving a corresponding elastic member.

14. The portable electronic device as claimed in claim 13, wherein the tray includes a cover portion formed at one end of the tray body, and two hooks deformedly formed at another end of the tray body opposite to the cover portion, the cover portion covers the opening, and the hooks prevent the tray from separating from the housing.

* * * * *